Sept. 25, 1934.  F. T. ROBERTS  1,974,629
METHOD OF AND APPARATUS FOR MAKING INNER TUBES FOR TIRES
Filed May 9, 1930
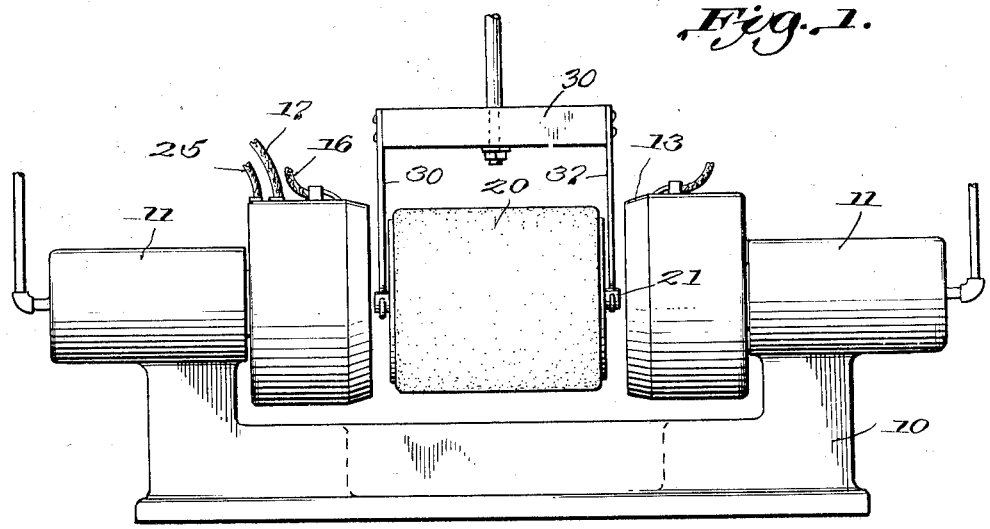
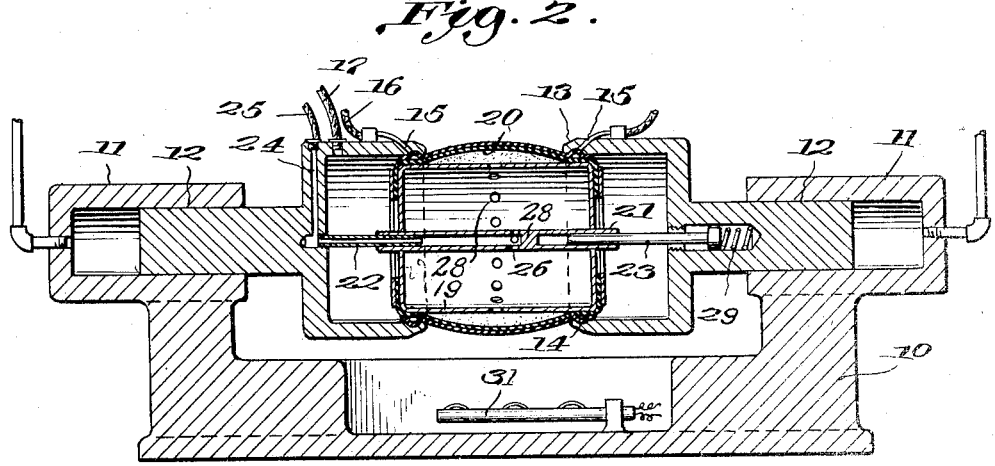
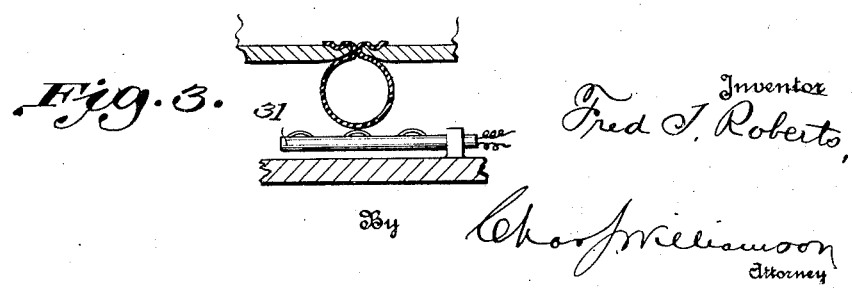

Patented Sept. 25, 1934

1,974,629

UNITED STATES PATENT OFFICE

1,974,629

METHOD OF AND APPARATUS FOR MAKING INNER TUBES FOR TIRES

Fred Thomas Roberts, Ridgewood, N. J., assignor to Frank A. Daly, Pawtucket, R. I., trustee Application May 9, 1930, Serial No. 451,176

11 Claims. (Cl. 154—14)

My invention relates to the manufacture of pneumatic tires and particularly to the manufacture of inner tubes. Objects of my invention are a simplification of apparatus and speed of output. I shall describe my invention in connection with apparatus for making inner tubes.

My invention consists in whatever is described by or is included within the terms or scope of the appended claims.

In the drawing:—

Fig. 1 is a view in side elevation of apparatus embodying or for the practice of my invention with the parts shown arranged immediately after placing in position for operation the blank or band of the stock for forming the tube;

Fig. 2 is a view partly in side elevation and partly in section showing the parts arranged in readiness for manipulation of the blank to convert it into a finished tube;

Fig. 3 is a detail view in section showing the completion of the inner tube by the doubling over thereof of the walls and the formation of the seam.

It has been proposed to manufacture inner tubes for pneumatic tires by providing an annular chamber with a wall which in cross section is substantially elliptical, but open on its inner periphery so that it is substantially U-shape, and forcing a "pulley" or annular band placed across the open inner periphery into that chamber by suction from within a vacuum box. To accomplish that, the band (which, of course, is of rubber) must be stretched as it is forced into the U-shape chamber in order to make it conform to the bellied, laterally and outwardly curving concave interior of the chamber, so that stretching of the rubber sheet or band must take place laterally or parallel with the axis of the annular chamber, as well as radially outward. There are limitations to the stretchability of the rubber band or blank which greatly limit, if indeed they do not render impracticable, the production of a rubber inner tube for tires. By my invention, it will be found that while I start with a "pulley" or a flat rimmed annular band of rubber and cause the band to stretch radially outward to produce the outer periphery of the finished tube, I do not stretch the rubber laterally to make it conform or adapt itself to the wall of any U-shape chamber, but as the radial stretching takes place, the opposite sides or edges of the annular band, as outward radial bulging takes place, are made to approach, either by movement of both edges simultaneously, or of one edge towards the other, so that by the mere drawing towards one another of those portions of the band (which constitute the side walls of the completed inner tube) towards the inner periphery of the tube, the substantially elliptical form of the inner tube in cross-section is produced and without any necessity for stretching the rubber. Thus the limitations above mentioned as to stretchability are not taken into account and do not require to be taken into account in producing an inner tube in accordance with my invention.

In the embodiment of my invention shown in the drawing, there are two opposite and concentric or axially alining ring-form members each carried by the platen mounted on the ram of a hydraulic press and movable towards and from one another axially and which when farthest apart are overlapped on their inner peripheries by the opposite edge portions of the rubber or elastic band which are secured to such peripheries pneumatically during the operation of stretching the band radially outward pneumatically which is accomplished by the application of air-pressure to the inner side of said blank or band; and simultaneously with such radial movement outward, the edge portions of the band are made to approach and are brought together and finally joined by a seam on the inner periphery of the then finished tube. This seaming or joining is accomplished by the pressure from the opposing edges of the two supporting rings upon the interposed rubber. The outward bulging of the elastic blank takes place without the exterior thereof coming into contact with any external supporting surface, such a surface being unnecessary because there is no lateral stretching or expansion outwardly of the walls of the tube being formed, but on the contrary the walls in a lateral direction are simply moved towards one another without any stretching of the material and incidental to the action of the two rings in being made to approach one another for the purpose finally of sealing or seaming together the edges at the inner periphery of the finished tube. In effect, the walls are closed or brought together and joined at the inner periphery about an annular core or body of air.

Describing in detail what is shown in the drawing, upon a base, 10, in axial alinement horizontally are mounted two opposite hydraulic cylinders, 11, not requiring any specific illustration or description. The ram, 12, of each carries at its inner end a hollow cylindrical head, the outer open end portion of which constitutes the band blank engaging ring, 13. Each ring, 13, has close to its edge and on its inner periphery an annular groove, 14, into which from the outside leads one or more air holes, 15, the outer end of which is connected by a flexible pipe or hose, 16, with a vacuum pump. Thus a partial vacuum may be produced on the outer side of the rubber band overlying the annular groove and thereby that edge portion of the band is securely held and held with an air-tight seal to the ring.

The interior of the hollow cylindrical portion of one or both heads, 13, is connected by a pipe or hose, 17, with a compressed air tank or other source of air under pressure to supply the air pressure for blowing and stretching the blank radially outward concurrently with the movement of the two heads, 13, towards each other as before described.

The band which forms the blank in which the inner tube is to be made is, of course, inherently flimsy and lacking in enough rigidity to be self-supporting. I, therefore, provide means that constitute a temporary support for placing it in the press and with its opposite edges in contact with the inner peripheries of the rings 18. Such means comprise a cylindrical drum, 19, having a peripheral cover or envelope, 20, preferably of rubber secured at opposite ends to the drum heads in an air-tight manner so that by the introduction of air pressure on the inner side of the cover or envelope, it will bulge or expand convexly outward and have a corresponding action or effect upon the annular band or blank from which the tube is to be made that is placed over the drum in a loose or relaxed state. The blank will thus be supported and by placing the drum through the space between the two rings, 13, and so that the opposite end edges of the blank are opposite the inner peripheries of the respective rings, 13, the band may be placed in position for the action of the press. When placed in such position, the band edges are in contact with the inner peripheries of said rings and upon the production of the vacuum between the band edges and the rings, such edges will be tightly held in contact with the ring surfaces and the band bellied slightly outwards will extend across between the two now widely separated rings. Before or at the time of the vacuum action through holes, 15, air-pressure through pipe, 17, will force the edges in contact with the grooved inner periphery of the rings.

The drum, 19, has an axial tubular shaft, 21, and one of the ram heads has an axial tubular rod or stem, 22, adapted to enter and pass partially through said tubular shaft and the other ram head has an axial solid rod, 23, adapted to enter and pass partially through said drum shaft from the other side. The drum is thus supported by said rods. The tubular rod, 22, is connected by a radial air passage, 24, at its inner end to a pipe or hose, 25, through which compressed air enters the tube and issuing therefrom at its inner end, when inserted in the drum, enters the interior of the latter through radial holes, 26, in the drum shaft, and by holes, 27, in the cylindrical wall of the drum air enters the interior of the flexible envelope, 20, and thereby expands the latter, as before explained. On cutting off the air supply to the interior of the envelope, it will collapse, leaving the inner surface of the tube blank exposed to full air pressure flowing into the ram head through the pipe, 17.

To facilitate the entrance of air between the envelope and the tube blank, the exterior of the envelope may be provided with longitudinal grooves Immediately beyond the inner inserted end of the tubular air supplying rod, 22, the tubular drum shaft has a solid cross wall, 28, and as said cross wall or partition engages the inserted end of the solid rod, 23, the latter is slidably mounted in the ram which carries it and within the ram is a coil spring, 29, to allow a certain amount of longitudinal movement of said solid rod.

For the ready transfer of the drum to and from in position between the hollow cylindrical ram heads, a fork, 30, adapted to be suspended from a crane may be used, the fork straddling the drum and having a hook to catch under each projecting end of the drum shaft. The fork of course, is detached after the ram rods enter far enough into the hollow shaft to support the drum in central position and then the fork is removed so that the approaching motion of the blank-supporting rings may take place.

Preferably to cut off the air pressure from the tube when it has been distended to the desired extent an automatic device which cooperates by contact therewith of the tube may be provided to cut off the air supply. Such a device may be the electrical arrangement set forth in my application for Patent No. 451,175 filed May 9, 1930 and, therefore, need not be shown and described in detail herein. Said device includes a switch, 31, in a circuit with a magnetic or solenoid air valve. The drum, 19, remains in the apparatus until the completion of the inner tube and upon the separation of the ram-carried rings, 13 and the removal of the supporting rods, 22 and 23, from the drum shaft, the drum may be manually removed, or before the complete removal of the supporting rods is effected, the fork, 30, may be brought into engagement with the drum shaft to remove the drum by power.

What I claim is:—

1. A method of making pneumatic tire members which includes the acts of placing a flexible annular band-form blank between peripheral surfaces of opposite ring-form elements, supporting the portion of such blank intermediate the ends thereof, subjecting the end portions of such blank to positive and negative pressures on opposite sides and supplying pressure between the interior of the blank and the exterior of the support to belly the pressure-receiving portion of the blank outward.

2. A method of making pneumatic tire members which includes the acts of placing a flexible annular band-form blank between peripheral surfaces of opposite ring-form elements, supporting the portion of such blank intermediate the ends thereof, subjecting the end portions of such blank to positive and negative pressures on opposite sides and supplying pressure between the interior of the blank and the exterior of the support to belly the pressure-receiving portion of the blank outward, and bringing the edge portions of the blank together during such bellying action.

3. A method of making pneumatic tire members which includes the acts of placing a flexible annular band-form blank between peripheral surfaces of opposite ring-form elements, supporting the portion of such blank intermediate the ends thereof, subjecting the end portions of such blank to positive and negative pressures on opposite sides and supplying pressure between the interior of the blank and the exterior of the support to belly the pressure-receiving portion of the blank outward, and bringing the edge portions of the blank together during such bellying action, and joining the parts that come into contact.

4. Apparatus for making pneumatic tire parts comprising opposite ring-form members having internal blank edge contacting surfaces each terminating in a seaming edge, a support for a blank situated between such edges, means for moving said ring-form members over the blank while on said support to close the blank into tube form and join the blank edges together, means for attaching the end margins of the blank to said internal surfaces and means for bellying the blank outward from said support.

5. Apparatus for making pneumatic tire parts comprising opposite ring-form members having internal blank edge contacting surfaces each terminating in a seaming edge, a support for a blank situated between such edges, means for moving said ring-form members over the blank while on said support, means for attaching the end margins of the blank to said internal surfaces, means for bellying the blank outward from said support, and means for supporting said blank support connected with said ring-form members.

6. Apparatus for making pneumatic tire parts comprising opposite ring-form members having internal blank edge contacting surfaces each terminating in a seaming edge, a support for a blank situated between such edges, means for moving said ring-form members over the blank while on said support, means for attaching the end margins of the blank to said internal surfaces, means for bellying the blank outward from said support, said support being hollow and means for introducing fluid under pressure to the interior of such support and delivering it to the exterior of the support.

7. Apparatus for making pneumatic tire parts comprising opposite ring-form elements each with a seaming edge, a blank-engaging surface on each element adjacent such edge, means for expanding said blank by fluid pressure means for moving said ring-form elements together to place portions of the blank overlying such edges into contact and joining them and means for expanding the blank outwardly.

8. Apparatus for making pneumatic tire parts comprising two hollow cylindrical heads in axial alinement, each head having a free blank-engaging edge, the two edges being towards one another, a blank supporting drum, means supporting said drum concentric with said heads comprising an axially located rod carried by at least one of the heads and a cooperating member within the drum.

9. Apparatus for making pneumatic tire parts comprising two hollow cylindrical heads in axial alinement, each head having a free blank-engaging edge, the two edges being towards one another, a blank supporting drum, means supporting said drum concentric with said heads comprising an axially located rod carried by at least one of the heads, a cooperating member within the drum, said rod being hollow and opening at one end within the drum and connected at its other end with a source of fluid under pressure, and means for flow of fluid pressure from within the drum to the exterior thereof.

10. A method of making pneumatic tire parts which includes the acts of placing a flexible annular band-form blank between peripheral surfaces of opposite ring-form elements, causing the margins of such blank to be subjected to positive and negative pressure on opposite sides, introducing air pressure upon the inside of the blank between such margins while the blank is opposite a space between them, to belly such portion outward, and bringing such marginal portions of the blank towards one another while supported by said ring-form elements, such bellying movement under pressure being concurrent with the movement of the marginal portions of the blank towards one another and without stretching the material of the blank that constitutes the side walls of the completed article.

11. A method of making pneumatic tire parts which includes the acts of placing a flexible annular band-form blank between peripheral surfaces of opposite ring-form elements, causing the margins of such blank to be subjected to positive and negative pressure on opposite sides, introducing air pressure upon the inside of the blank between such margins while the blank is opposite a space between them, to belly such portion outward, and bringing such marginal portions of the blank towards one another while supported by said ring-form elements, and until they contact and are together, such bellying movement under pressure being concurrent with the movement of the marginal portions of the blank towards one another and without stretching the material of the blank that constitutes the side walls of the completed article.

FRED THOMAS ROBERTS.